United States Patent [19]
Thorn

[11] Patent Number: 4,899,997
[45] Date of Patent: Feb. 13, 1990

[54] FLUID FILLED RESILIENT BUSHING

[75] Inventor: Richard P. Thorn, Erie, Pa.

[73] Assignee: Lord Corporation, Erie, Pa.

[21] Appl. No.: 251,269

[22] Filed: Sep. 30, 1988

[51] Int. Cl.$^4$ .............. F16F 13/00; B60G 15/04; B60G 15/12; B60K 5/12

[52] U.S. Cl. ................... 267/140.1; 267/35; 267/140.2; 267/141.2; 267/141.6; 267/219

[58] Field of Search ............. 267/140.1, 140.2, 140.3, 267/140.5, 141.2, 141.3, 141.4, 141.6, 152, 64.15, 64.23, 113, 118, 122, 35, 279, 219; 180/300, 312, 902; 248/636, 562, 575

[56] References Cited

U.S. PATENT DOCUMENTS

| | | | |
|---|---|---|---|
| 3,642,268 | 2/1972 | Hipsher | 267/57.1 |
| 3,698,703 | 10/1972 | Hipsher | 267/63 |
| 4,183,496 | 1/1980 | Brock et al. | 267/141.4 X |
| 4,471,935 | 9/1984 | Chiba et al. | 267/141.2 X |
| 4,605,207 | 8/1986 | Konishi | 267/57.1 |
| 4,630,806 | 12/1986 | Dan et al. | 267/140.1 |
| 4,657,227 | 4/1987 | Hofmann | 267/140.1 X |
| 4,667,942 | 5/1987 | Bitschkus et al. | 267/140.1 |
| 4,693,456 | 9/1987 | Kanda | 267/140.1 |
| 4,700,934 | 10/1987 | Andrä et al. | 267/141.2 X |
| 4,717,111 | 1/1988 | Saito | 248/562 |
| 4,728,086 | 3/1988 | Ishiyama et al. | 267/140.1 |
| 4,749,173 | 6/1988 | Kanda | 267/140.1 |
| 4,749,174 | 6/1988 | Kanda | 267/140.1 |
| 4,763,884 | 8/1988 | Matusi et al. | 267/140.1 |
| 4,771,990 | 9/1988 | Domer et al. | 267/140.1 |
| 4,790,520 | 12/1988 | Tanaka et al. | 267/141.6 X |
| 4,822,010 | 4/1989 | Thorn | 267/140.1 |

FOREIGN PATENT DOCUMENTS

| | | | |
|---|---|---|---|
| 2616258 | 11/1977 | Fed. Rep. of Germany | 267/140.1 |
| 2703038 | 7/1978 | Fed. Rep. of Germany | 267/141.2 |
| 0063141 | 5/1981 | Japan | 267/141.2 |
| 0208650 | 10/1985 | Japan | 267/219 |
| 0184250 | 8/1987 | Japan | 267/140.1 |
| 0261731 | 11/1987 | Japan | 267/140.1 |
| 0292941 | 12/1987 | Japan | 267/140.1 |
| 2192968 | 1/1988 | United Kingdom | 267/140.1 |

*Primary Examiner*—Douglas C. Butler
*Attorney, Agent, or Firm*—Philip P. McCann; James W. Wright

[57] ABSTRACT

A fluid filled resilient bushing assembly for vibration control, particularly adapted for use in a suspension system, which includes an elongate inner rigid member and an elongate outer rigid sleeve member, a resilient device interposed between the inner and outer members. The resilient device together with the outer member defines two circumferentially and axially-spaced chambers and a restricted passageway connecting the chambers. The chambers and passageway contain an incompressible fluid. Disposed in one chamber is a elastomeric channel device that preloads the bushing as to radially offset the inner member relative to the outer sleeve member.

2 Claims, 1 Drawing Sheet

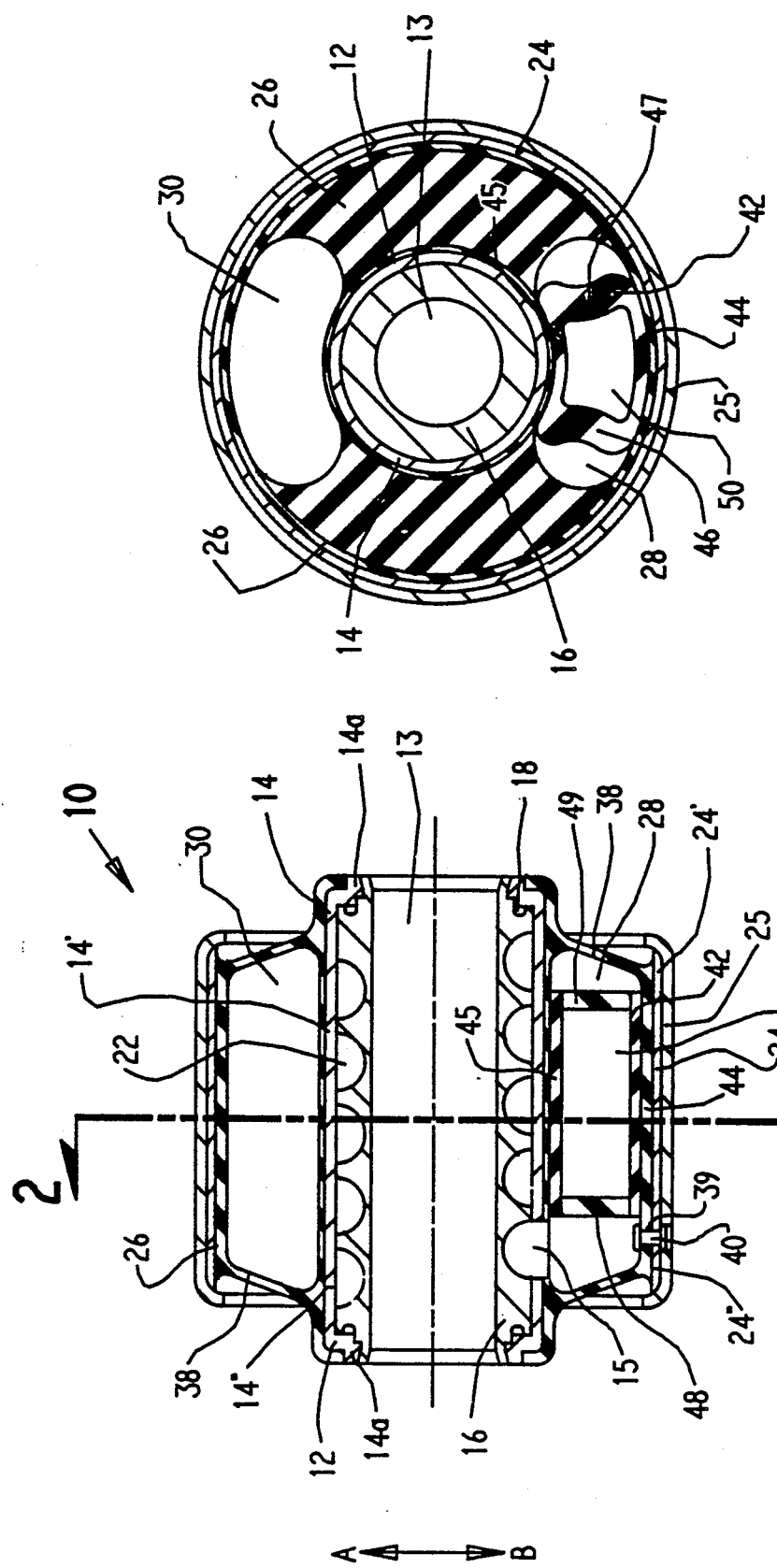

FLUID FILLED RESILIENT BUSHING

FIELD OF THE INVENTION

The present invention relates generally to fluid filled resilient bushing assemblies, and more particularly the present invention relates to fluid filled resilient bushing assemblies for vibration isolation and damping.

BACKGROUND OF THE INVENTION

In recent years bushing assemblies have been useful as vibration isolation and damping structure at a connecting joint between a base member and a member movable about the connecting joint in such applications as machinery, airplanes, boats and vehicular transportation. Generally, the base member has two ends, one end affixed to a relative stationary frame and the second end defining a mating member forming a part of a housing of the connecting joint. The member movable about the connecting joint also has two ends, one end affixed to an element movable with respect to the frame, and a second end defining a mating member which along with the mating member of the base member forms the housing of the connecting joint. The bushing assembly is affixed within the housing of the connecting joint and controls forces and accommodates movement from the movable element generally in the radial direction of the housing assembly.

Various forms of movements occur at the connecting joint including static and dynamic vibratory motions. It is desirable that the bushing assembly be capable of isolating and damping such vibratory motions, thereby reducing the transmittal of such vibratory motions to the base member while accommodating static deflections.

In vehicular transportation such as automobiles, bushing assemblies are widely used at joints in the suspension assemblies to control forces and accommodate movement including vibratory motions. One concern in automobiles is the reduction of vibratory motions induced from the road surface and isolation of the passenger compartment from such motions. Such vibratory motions may comprise a range of amplitudes and frequencies and mtions in various directions. Relative to the road, the vibratory motion may be vertical, such as up and down motion, or it may be horizontal, such as the sway motion incurred in cornering of a car. Automotive suspension systems are designed to reduce such vibratory motions. A front end suspension system is made up of components including various arms, rods, links, etc. intermediate of the frame and the wheel assembly of the car. Generally, an elongated arm extends from the wheel assembly, and another arm extends from the frame which are connected together at a connecting joint by a bushing assembly.

One common type of bushing assembly is a rubber bushing. An example of such a bushing is disclosed in U.S. Pat. Nos. 4,121,813 and 2,948,502. In the disclosed patents the rubber bushings generally have annular elongate inner and outer members disposed in a coaxial and radially spaced apart relation and a resilient elastomer member interposed therebetween. Such bushings are used to control and transmit movement but have limited capability in damping vibrations. Damping of vibrations is attained by dissipating the energy of the vibratory motion. The damping provided by elastomers is a function of the hysteresis property of the elastomer. In general, rubber bushings can be said to provide little damping.

Another form of bushing assembly is fluid filled bushings. Such bushings are more suitable to provide damping. An example of such bushings are disclosed in U.S. Pat. Nos. 3,698,703 and 3,642,268. In the disclosed patents, the fluid filled bushings generally include a cylindrical elongate inner rigid member, an elongate outer rigid sleeve member concentrically disposed and radially spaced from the inner member and a resilient means disposed between the inner member and outer sleeve member. The resilient elastomeric means defines a pair of circumferentially spaced and diametrically opposed fluid filled chambers fluidly connected by an elongate restricted passageway.

The fluid chambers and restricted passageway are filled with a suitable incompressible fluid. The fluid chambers are fluidly connected by the restricted passageway. U.S. Pat. No. 4,693,456 disclosed a fluid filled resilient bushing assembly having a spiral shaped restricted passageway in the elongate outer rigid sleeve.

Such fluid filled bushing assemblies are installed in connecting joints such that the longitudinal axis of the bushing is generally perpendicular to the longitudinal axis of the arms connected. In such an assembly, motions are conducted along the radial axis of the bushing. In operation, in response to vibratory motions along the radial direction of the bushing assembly between the inner member and outer sleeve member, fluid is displaced from one chamber via the restricted passageway to the second chamber in a direction opposite to the vibratory motion. In particular, when a first chamber is contracted, the fluid is displaced therefrom through the restricted passageway to an expanding second chamber. In the reverse cycle of the vibratory motion, when the first chamber is expanding and the second chamber is contracting, the fluid is reversibly moved through the restricted passageway. As can be seen, an oscillatory motion of the fluid is generated within the restricted passageway between two chambers diameter about a radial direction.

The oscillatory fluid in the restricted passageway creates a fluid resistance and/or a means or inertia resistance to the pumping forces of the chambers resulting in damping or the vibratory motions along the radial direction of the bushing assembly. The chambers may be circumferentially spaced to provide damping along more than one radial direction. Intermediate of the chambers, the bushing assembly comprises a solid rubber member, extending along the axial direction of the bushing assembly wherein these sections of the bushing assembly have the characteristics of the rubber bushing with respect to vibratory motion.

The above referred to bushing assemblies are suitable for applications having zero static radial deflection of the inner member relative to the outer member. In these applications, the radial distance between the inner and outer members is generally equal until motions are applied to deflect the inner member relative to the outer member. However, in some applications the design of the connecting arms impose a static radial deflection on the bushing assembly, offsetting the inner member relative to the outer member under static conditions. Such continuous static deflection imposes a stress on the end walls of the bushing assembly, possibly resulting in a shorter life for the bushing. It is desirous to have a bushing assembly with a preload that would oppose static deflection such that the bushing would have a generally equal radial distance between the inner and outer members under static conditions.

SUMMARY OF THE INVENTION

With the foregoing in mind, a primary object of the present invention is to provide an improved fluid filled resilient bushing assembly particularly suited for connecting relatively movable components.

Another object of the present invention is to provide a novel fluid filled resilient bushing assembly providing damping of vibratory motion at excitations of various amplitudes and frequencies in the radial direction.

Still another object of the present invention is to provide a novel fluid filled resilient bushing assembly maintaining equal radial distance between the inner and outer members under static conditions when a static load cuases excessive deflections of the inner member relative the outer member.

It is a feature of this invention to have a means to radially preload a bushing assembly located in one chamber to maintain equal radial distance between the inner and outer members.

It is an advantage of this invention that the end walls of the bushing assembly are not continuously stressed by static loads applied to the bushing assembly.

More specifically, in the present invention a fluid filled resilient bushing assembly is described having an elongate inner rigid member, an elongate outer rigid sleeve member disposed about and radially spaced from the inner member to define a space therebetween. A resilient means is disposed about the inner member between the inner and outer members. The resilient means defines at least two spaced chambers interconnected by a shaped restricted passageway defined by the inner rigid member wherein the two chambers are circumferentially spaced. An incompressible fluid is contained in the spaced chambers and restricted passageway. Disposed inbetween the inner and outer members is a molded elastomeric enclosed channel to maintain generally equal radial distance between the members offsetting static loading.

BRIEF DESCRIPTION OF THE DRAWINGS

The foregoing and other objects, features and advantages should become apparent from the following description when taken in conjunction with the accompanying drawings, in which:

FIG. 1 is a longitudinal sectional view taken along the mid axial plane of a bushing assembly of the present invention showing the circumferentially spaced chambers, spiral restricted passageway and a molded elastomeric enclosed channel in one chamber;

FIG. 2 is a view taken along line 2—2 of FIG. 1 showing a cross-sectional view of the two chambers, one of which contains the molded elastomeric enclosed channel.

DESCRIPTION OF THE PREFERRED EMBODIMENTS

Referring now to the drawings, FIG. 1 illustrates a longitudinal sectional view wherein the sectional view is taken along the mid axial plane of a fluid filled resilient bushing assembly 10 which embodies the present invention. For clarity, FIG. 2 illustrates an elevational cross-sectional view taken along line 2—2 of FIG. 1. The bushing assembly 10 includes a cylindrical elongate inner rigid member 12 having an annular bore 13 there through suitable to receive a member (not shown) to connect the bushing assembly 10 to an external structure such as two components of a suspension system.

The inner rigid member 12 includes a cylindrical elongate outer rigid mating member 14 and cylindrical elongate rigid sleeve member 16 and an annular rubber seal 18. The rigid mating member 14 has a radially outward crimped portion 14a at each axial end thereof. The mating member 14 is made of two components 14', 14" joined together at line 2—2. Axially and circumferentially spaced along the mating member 14 are two apertures therethrough or two orifices (one of which is shown) 15. The cylindrical elongate inner rigid sleeve member 16 is concentrically disposed inwardly of and adjacent to the outer rigid mating member 14. The annular rubber seal 18 is disposed between the crimped portion 14a of the inner rigid mating member 14 and the outer rigid sleeve member 16 at the axial outer ends of the sleeve member 16. The annular rubber seal 18 is affixed to the inner rigid sleeve member 16 and the outer rigid mating member 14 by a suitable rubber to metal adhesive.

Defined between the radial outer portion of the inner rigid sleeve member 16 and the mating member 14 is a spiral shaped passageway 22 having a semi-circular cross-sectional area. The passageway 22 extends spirally along the axial length of the inner rigid sleeve member 16 between the two spaced orifices 15. The semi-circular cross-sectional area of the passageway 22 is formed in the rigid sleeve member 16. The mating member 14 provides a flat sealing interface with the cross-sectional area to define the restricted passageway 22. One major advantage of the spiral shaped restricted passageway is the length to diameter ratio thereof which is from about 20:1 to about 50:1. The spiral configuration of the restricted passageway is from about 1 to about 8 turns per inch preferably from about 2 to about 6 turns per inch, most preferably 4 to 5 turns per inch.

A cylindrical elongate rigid sleeve member 24 is concentrically disposed about and radially outwardly spaced fromthe inner member 12 to define an annular space therebetween. The rigid sleeve member 24 is made of two components 24', 24" joined together at line 2—2. Disposed radially outwardly of and adjacently to the sleeve member 24 is a second sleeve member 25 that extends axially outwardly of both ends of the sleeve member 24. Each end ofthe second sleeve member 25 is crimped radially inwardly over the ends of the sleeve member 24. In the present embodiment the radial outer mating member 14, inner rigid sleeve member 16, the sleeve member 24 and second sleeve member 25 are made of a cold drawn low carbon steel. Other rigid materials may be used depending on the designers choice.

A resilient means 26 is disposed between the inner rigid member 12 and the rigid sleeve member 24. In the present invention the resilient means 26 is molded of elastomeric material such as high temperature natural rubber in a unitary piece which is inserted sealingly combined between the inner and sleeve members. The inner member 12 and sleeve member 24 are preferably bonded to the resilient means 26 by a suitable rubber to metal adhesive.

The resilient means 26 defines two circumferentially spaced chambers 28, 30 diametric about the inner rigid member 12. FIG. 2 shows the circumferential spacing of the chambers 28, 30. The two chambers 28, 30 are fluidly interconnected by the spiral shaped restricted passageway 22 and the two orifices 15. As shown in FIG. 1, each of the chambers 28, 30 has two flexible end walls 38, each extending from sealingly combining the innerrigid member 12 and the rigid sleeve member 24.

The pair of chambers 28, 30 and the restricted passageway 22 are filled with a substantially incompressible working fluid (not shown) such as a mixture of ethylene glycol and water. The chambers 28, 30 and the restricted passageway 22 are filled with the working fluid through an aperture 39 extending through the resilient means 26, sleeve member 24 and second sleeve member 25. The aperture 39 is sealingly blocked by a plug 40 after the chambers 28, 30 and restricted passageway 22 are filled. The efficiency with which the working fluid is displaced between the chambers 28, 30 is affected by the flexibility of the end walls 38 which can be defined as volume compliance. This compliance is defined as the ratio of a change in pressure of a chamber to the change in volume caused thereby. Thus, C=dP/dV. Thus, when a small change in volume results in a large change in pressure, the compliance is high. The compliance of the end walls 38 of each chamber 28, 30 is greater than that of its adjacent wall portions so that it is capable of being flexed readily by hydrodynamic pressure developed in the chambers in the course of operation of the bushing assembly 10. In particular, the flexural motion of the walls 38 occurs as a result of alternating pressure resulting from the vibratory motions.

The efficiency of the displacement of the working fluid between the chambers 28, 30 is also affected by the restricted passageway 22. As shown in FIG. 1, the restricted passageway 22 extends from one chamber 28 to the other chamber 30. The efficiency of the displacement of the working fluid in the restricted passageway is affected by the inertia ($\rho l/A$ wherein $\rho$=mass density; $l$=length of passageway; and A=area of passageway) of the fluid and the fluid losses within the restricted passageway. The increased inertia as found in the bushing assembly of the present invention provides for increased flexibility and performance to accommodate lower tuning frequencies and a wide range of vibratory motions.

Disposed in one chamber 28 between the inner member 12 and sleeve member 24 is a collapsible column elastomeric preload member 42 that functions to offset radial static deflections of the inner member 12 relative to the sleeve member 24. As shown in FIGS. 1 and 2, the preload member 42 is a closed member having four axial walls 44, 45, 46, 47 and open ends 48, 49 integrally connected to form an open ended chamber 50. The preload member 42 is positioned adjacent to and contacting the inner member 12 and the sleeve member 24 and axially extends about 60% of the axial length of the chamber 28. In the present embodiment, the preload member 42 is designed to maintain the center position of the inner member 12 under static loads. It is understood that hte design of the preload member 12 depends on the static load, desired static offset of the inner member 12, fatigue life and motion limits. The preload member 42 is designed to accommodate radial vibratory motions with the bushing 10. The collapsible column design is suitable to allow the inner member 12 to move radially relative to the outer member 24 when dynamic radial vibratory motions are applied.

Bushing assemblies 10 of the present invention are particularly suitable for large static deflections in the range of 10 to 15 mm and providing damping in the frequency range of 4 to 6 Hertz.

During operation, vibratory motions in the radial direction represented in FIG. 1 by the arrows A, B respectively, cause the working fluid to oscillate in the restricted passageway 22 between the first chamber 28 and the second chamber 30. Oscillation of the working fluid within the restricted passageway 22 acts as a damping effect against the vibratory motion. In FIG. 1, the two chambers 28, 30 are diametric of the rigid inner member 12, lying in a singular radial plane. As one can appreciate, the preload member 42 serves to offset static deflections on the inner member 12 to maintain concentricity of the bushing 10. The vibratory motions along the radial plane of the two chambers 28, 30 induce oscillating movement of the inner member 12 relative to the outer sleeve member 24 causing the working fluid to oscillate in the restricted passageway 22 between the first chamber 28, and the second chamber 30. In particular, when the vibratory motion pushes the inner member 12 towards the outer sleeve member24 contracting the first chamber 28 and the preload member 42, the working fluid is pushed from the first chamber 28, through the orifice 15 into the restricted passageway 22 and to the expanding second chamber 30. The inertia of the fluid in the passageway 22 causes a resistance to the contraction of the first chamber 28 resulting in a damping effect against the vibratory motion of the inner member 12 towards the sleeve member 24. When the vibratory motion reverses and pushes the inner member 12 towards the outer sleeve member 24 the second chamber 30 is contracted, wherein the vibratory motion is dampened by the resistance of the fluid flow through the restricted passageway 22. It is well known that the two chambers may be offset from the circumferentially spacing to provide damping of vibratory motion in two radial directions.

The manufacture of fluid filled bushing assemblies is well-known to those skilled in the art and may be accomplished by several different methods. Fluid filled bushing assemblies of the present invention are manufactured by separately manufacturing the components and then combining them. In particular, the mating member 14, cylindrical elongate rigid sleeve member 16, sleeve member 24 and second sleeve member 25 are formed according to standard metal working methods. The mating member 14 and the sleeve member 24 are made in two separate half components divided at the axial midpoint thereof. The parts are cleaned, a primer and suitable rubber-to-metal adhesive is applied to surfaces to which rubber will be applied. The rubber is applied to the separate half components by normal molding operations. In particular, the first half of the mating member 14 and the first half of the sleeve member 24 are placed in a mold and rubber is injected into the mold to form the resilient member 26 sealingly combining the members 14 and 24. In a separate operation, rubber is molded to the second half of the mating member 14 and the sleeve member 24. The preload member42 is inserted into one chamber. The two rubber seals 18 are placed on the axial ends of the sleeve member 16 which is then slid into the cavity radialy inward of the mating member 14 until the orifices 15 align with the restricted passageway 22. The axial ends of the mating member 14 are then crimped over the axial ends of the sleeve member 16 to secure the sleeve member 16 in place. The two halves are then assembled and the second sleeve member 25 is slid over the sleeve member 24 whereafter the ends of the second sleeve member 25 are radially inwardly crimped to secure the assembly. The chambers 28, 30 and passageway 22 are filled with fluid whereafter the plug 40 is inserted into the aperture 39.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teaching of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A fluid filled resilient bushing assembly for vibration isolation and control comprising:

an elongate inner rigid member;

an elongate outer rigid sleeve member disposed about and radially spaced from said inner rigid member to define a space therebetween;

a resilient means disposed about said inner rigid member between said inner rigid member and said outer rigid sleeve member for sealingly connecting said inner rigid member to said outer rigid sleeve member, said resilient means defines at least two circumferentially spaced chambers;

a restricted passageway fluidly interconnecting said at least two circumferentially spaced chambers;

a separate molded elastomeric enclosed channel disposed in one chamber to radially preload said bushing assembly, whereby said inner rigid member is deflected nonconcentrically of said outer rigid sleeve member by said molded elastomeric enclosed channel and an incompressible fluid filling said chambers and said restricted passageway;

wherein during vibratory motion between inner rigid member and said outer rigid sleeve member at least one of said spaced chambers is contracted and another of said spaced chambers is expanded causing said incompressible fluid to flow through said restricted passageway from said contracting chamber to said expanding chamber.

2. A fluid filled resilient bushing assembly according to claim 1, wherein said restricted passageway is spiral shaped.

* * * * *